United States Patent [19]
Moffitt

[11] 3,804,343
[45] Apr. 16, 1974

[54] MEAT SAMPLING DEVICE
[75] Inventor: John G. Moffitt, Phoenix, Ariz.
[73] Assignee: International Telephone and Telegraph Corporation, Nutley, N.J.
[22] Filed: Dec. 6, 1972
[21] Appl. No.: 312,535

[52] U.S. Cl.................. 241/37.5, 99/493, 241/222, 241/280
[51] Int. Cl. ............................................. B02c 18/36
[58] Field of Search .......................... 241/277–279, 241/280, 221, 222, 168, 169.1, 37.5; 99/493

[56] References Cited
UNITED STATES PATENTS
2,012,167   8/1935   Johnston........................... 241/37.5
2,006,318   6/1935   Schmidt............................. 241/37.5
1,675,809   7/1928   Knowlton....................... 241/280 X
1,736,333   11/1929  Van Hooydonk................. 241/37.5

Primary Examiner—Roy Lake
Assistant Examiner—DeWalden W. Jones
Attorney, Agent, or Firm—John T. O'Halloran; Menotti J. Lombardi, Jr.

[57] ABSTRACT

A device to sample meat passing out of a meat grinder. The device comprises a tubular member mounted adjacent the grinder plate and configured to divert a predetermined amount of the meat that passes through the grinder plate to provide the desired sample.

7 Claims, 3 Drawing Figures

PATENTED APR 16 1974 3,804,343

3,804,343

MEAT SAMPLING DEVICE

BACKGROUND OF THE INVENTION

The invention relates to a device that obtains an accurate sample of meat passing through a meat grinder.

According to the prior art, the standard procedure of determining the per cent fat content of ground meat to be used for producing the various coldcuts, sausages, and similar type provisions, is to ground the meat components and fat together and then place them in a mixer for thorough mixing. The mixture is then sampled and the percent fat content of the mixture chemically analyzed and a determination made of the percent fat content for each mixed lot.

If the chemical analysis proved that the fat content was a higher percent than permitted, additional meat components were ground and then added to the mixed lot. The lot is then remixed and additional samples by chemical analysis made before the lot could be utilized for processing and producing the various provision items.

The purpose of the device according to the invention, therefore, is to provide a means of sampling and evaluating the meat composition before it goes into the mixer, so that any deviation from the accepted standards can be corrected immediately in the grinder. This saves valuable processing and handling time.

SUMMARY OF THE INVENTION

It is, therefore, an object of this invention to provide a device to sample meat passing out of a meat grinder.

Another object of this invention is to provide a device that obtains an accurate sample to evaluate the meat before it goes into a mixer so that any deviation from predetermined standards may be immediately corrected.

According to the broader aspects of the invention, the sample of meat is taken from a few holes at the outer edge of the grinder plate and diverted through a tube to an outlet.

According to a feature of the invention, the device obtains an accurate one per cent sample of the meat passing through a meat grinder.

BRIEF DESCRIPTION OF THE DRAWINGS

The foregoing objects and features of the invention will best be understood if reference is made to the following description in connection with the drawings, in which.

DESCRIPTION OF THE PREFERRED EMBODIMENT

Figure 1:
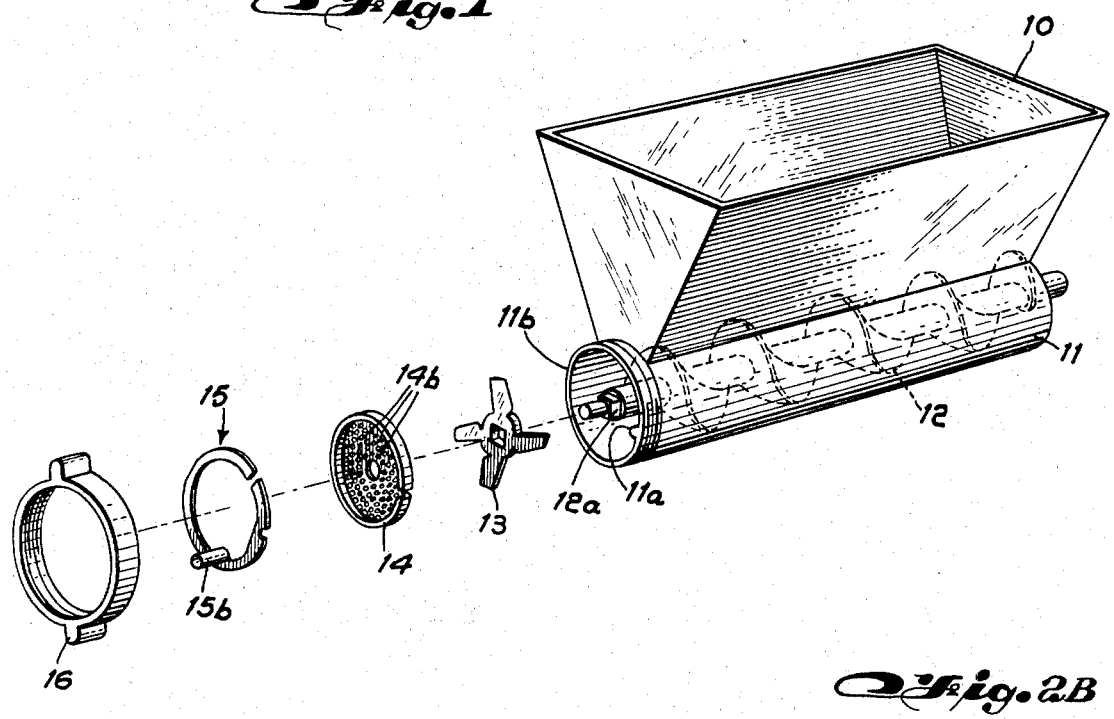
FIG. 1 is a perspective view of the apparatus for sampling and grinding meat according to the invention.

The concept for sampling of meat as it passes through a meat grinder will be described in connection with the apparatus illustrated in FIG. 1. The apparatus comprises a hopper 10 mounted atop a cylindrical housing 11 in which there is rotatably mounted a screw auger 12. Adjacent the output end of the auger 12 is a cutting blade 13 adapted to fit onto the auger shaft 12a and which is rotatably driven with the auger 12 by a motor (not shown) coupled to the opposite end of the shaft. Detachably mounted to the housing portion 11 is the grinder plate 14 having an anti-rotation notch 14a for mating with notch 11a of the housing and containing a multiplicity of holes 14b. The sampling device 15 comprising a ring member 15a and a sampling extension 15b mounts adjacent the grinder plate 14 and detachably fixed to the housing 11 by screw clamp 16 which is screwed onto the threads 11b of housing 11.

A sample of the meat composition deposited into the grinder is taken from a few of the holes 14b at the outer edge of the grinder plate 14 and diverted through the extension 15b to an outlet. For example, if the grinder plate 14 has a 600 hole pattern, then six holes at the outer edge of the plate will provide a one per cent sample if the tubular extension 15b is configured to cover the desired six hole pattern. It has been concluded that due to the manner in which the screw auger 12, of the grinder, spreads the meat against the face of the grinder plate 14, and the spinning blade 13 cuts the meat off in the holes of the plate, the sample provided by device 15 is a very random and accurate sample of the composition of meat being ground.

Figure 2A:
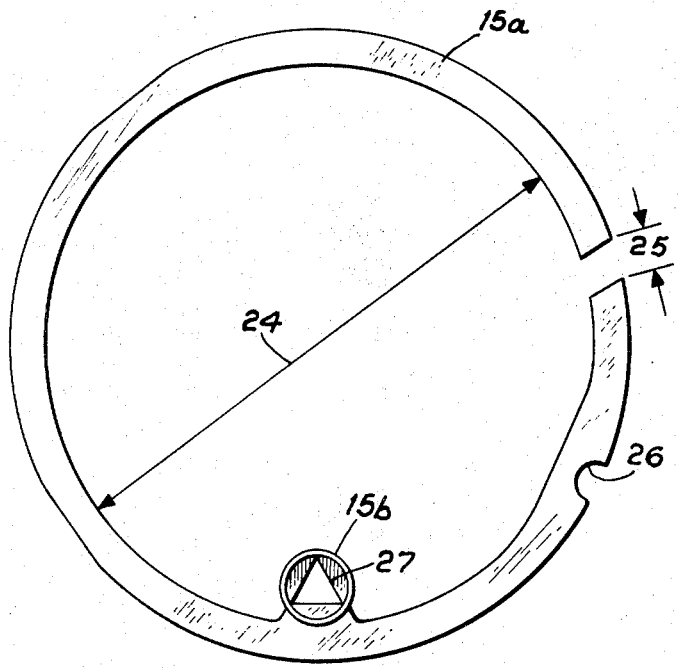
FIGS. 2a and 2b are details of the meat sampling device according to a preferred embodiment.
Figure 2B:
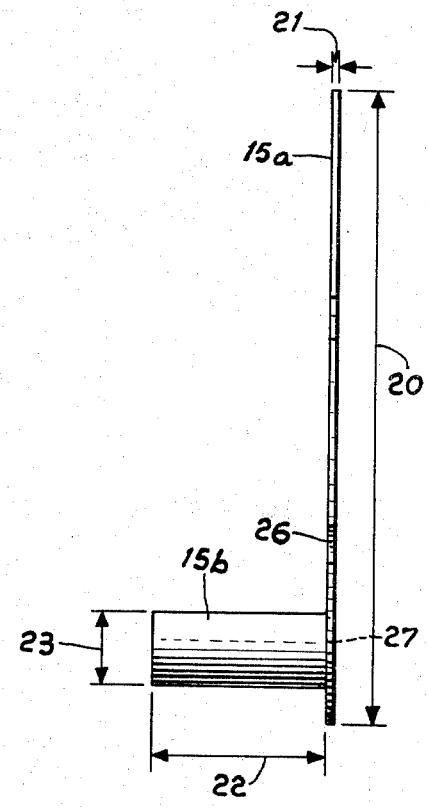

Referring to FIGS. 2a and 2b, a detail of a preferred device according to the invention is illustrated. For a meat grinder in which the grinder plate is approximately 8-¾ inches in diameter and contains 600 distributed holes, a device for sampling may be configured as follows. The outer diameter 20 of the device is approximately 8-¾ inches to match the O.D. of the grinder plate and has a width 21 of approximately ⅛ inch. The tubular extension 22 is approximately 2½ inches long with an O.D. 23 of approximately 1 inch and a 1/32 inch wall. The ring member 15a has an I.D. approximately 7-¾ inches and a cutout portion 25 to account for any eccentricities in the ring and enable it to be easily mounted. A cutout portion 26 engages anti-rotation point 11a of the housing. It is noted that the I.D. of the ring adjacent the cutout portion 26 is modified for structural purposes. According to the invention, a triangular shaped input opening 27 is provided in the extension to precisely permit only six holes in the grinder plate to be opened to the sampling extension. This allows an accurate one percent of the product through the sampler. It should, of course, be understood that the precise input opening configuration of the extension will depend on the number and size of the holes in the grinder plate that are required for obtaining the desired sample. Therefore, the opening 27 could have other geometrical shapes according to the sampling desired and the number and size of the strainer holes.

Referring to the following two tables, an analysis is given of four different meat lots to verify the accuracy of the device according to the invention. In Table I, test results using the sampling device for determining the percent of fat content of four lots of meat, A, B, C and D. Table II illustrates the same lots of meat, but the percent fat content is determined by taking mixer samples, four mixer samples were taken for each lot.

TABLES I & II

| GRINDER SAMPLING DEVICE - FAT CONTENT | MIXER SAMPLE - FAT CONTENT |
|---|---|
| A. 25% | 24.5% |
|  | 24.5% |
|  | 25.0% |
|  | 26.0% |
|  | 26.0% |
| B. 23.5% | 24% |

| | |
|---|---|
| | 23% |
| | 22.5% |
| | 24.0% |
| | 23.5% |
| C. 23.5% | 23% |
| | 22% |
| | 23% |
| | 22.5% |
| | 22.0% |
| D. 23.7% | 22.9% |
| | 23.5% |
| | 23.6% |
| | 23.8% |
| | 23.8% |

From the above chemical analysis, the samples taken at the output of the grinder accurately reflect the final content of the mixer samples. The device proposed, therefore, provides an accurate means to evaluate the ground meat before it goes into the mixer so that any deviation from a predetermined established standard can be corrected immediately in the grinder and not require additional processing in the mixer previous to sampling.

It is to be understood that the foregoing description of specific examples of this invention is made by way of example only and is not to be considered as a limitation on its scope.

I claim:

1. A device to sample meat passing out of a meat grinder comprising:
   a ring member mounted adjacent the grinder plate of said grinder; and
   a sampling extension attached to said ring member for obtaining a predetermined amount of ground meat.

2. The device of claim 1, wherein said device provides a one percent sample of the meat ground.

3. The device of claim 1, wherein said strainer has a multiplicity of holes and said sampling extension has a triangularly shaped input opening covering a predetermined number of holes in said strainer.

4. Apparatus for sampling and grinding meat comprising:
   a screw auger rotatably mounted within a grinder housing;
   a cutting blade mounted on the output end of said auger;
   a grinder plate mounted to said housing, whereby said screw auger forces the meat through the plate and the spinning blade cuts off the meat in the holes of the plate in a continuous manner; and
   means mounted adjacent the outer edge of the grinder plate to divert a predetermined sample of said ground meat.

5. The apparatus of claim 4, wherein said means is a tubular member covering a predetermined number of holes in said plate for the diverted sample.

6. The apparatus of claim 5, wherein said means provides approximately a one percent sample of the ground products.

7. In grinding apparatus comprising a screw auger rotatably mounted in a grinder housing, a cutting blade mounted to said auger, and a grinder plate through which meat-type products are forced through the grinding plate by said auger and cut by said blade, a device to sample the products passing out of said grinder, wherein the improvement comprises:
   a ring member detachably mounted adjacent the grinder plate; and
   a tubular sampling extension on said ring member for diverting a sample of said ground meat-type products from a predetermined portion of the outer edge of the grinder plate.

* * * * *